Inventor
CHESTER E. BEACHELL
by R. J. Filipkowski
AGENT

Inventor
CHESTER E. BEACHELL
by R. J. Filipkowski
AGENT

Inventor
CHESTER E. BEACHELL
by R. J. Filipkowski
AGENT

Inventor
CHESTER E. BEACHELL
by R. J. Filipkowski
AGENT

Inventor
CHESTER E. BEACHELL
by R. J. Filipkowski
AGENT

Inventor
CHESTER E. BEACHELL
by R. J. Filipkowski
AGENT

United States Patent Office 2,996,948
Patented Aug. 22, 1961

2,996,948

SOUND RECORDING AND REPRODUCING APPARATUS UTILIZING PERFORATED MAGNETIC TAPE

Chester Earnest Beachell, Beaurepaire, Quebec, Canada, assignor to Canadian Patents and Development Limited, Ottawa, Ontario, Canada Filed Apr. 2, 1956, Ser. No. 575,518
6 Claims. (Cl. 88—16.2)

The invention described herein is in improvements in apparatus for the recording and reproducing of electrical signals upon magnetizable tape, and in particular relates to equipment employing perforated magnetic tape having its principal use in association with motion picture apparatus for the recording and reproducing of sound accompaniment.

In its broadest concept the invention may be practiced with any continuous tape or strip record media in any width and may extend to optical recording or reproduction using such media, wherever it is required to provide a minimum of distortion in the record occasioned by speed variations of the media.

The invention as described herein is particularly concerned with apparatus adapted to handle a relatively narrow, limp tape in a thickness of the order of two thousandths of an inch, having sprocket holes along a marginal portion and a magnetizable surface upon which signals may be magnetically impressed. Such tape preferably comprises a plastic or synthetic polyester base of high tensile strength and linear stress-strain characteristic, with a surface coating of a material having suitable coercivity and retentivity values.

Attempts have been made in the past in the motion picture field to avoid synchronization problems of image and sound by employing magnetic tape carried directly upon a picture film strip as the sound track for recording upon or for reproducing sound therefrom, as a "single" media system. This imposes handicaps in the cutting, editing, and splicing of stock since by standards adopted in the art, the light gate is displaced a distance corresponding to 26 or 28 frames from the sound head. The use of unperforated magnetic tape as a sound record medium handled separately from the motion picture camera film strip has heretofore been impractical owing to the difficulty of establishing and maintaining synchronization and registry of separate image and sound vehicles, and in the cutting, splicing and handling by reproducing equipment in theaters and in television broadcast studios.

This invention therefore is concerned with practical and efficaceous solutions to the problems indicated, and provides a novel sound equipment separate from the picture medium employing a thin limp tape sound recording and reproducing medium of excellent handling characteristics having a line of sprocket holes regularly spaced therealong; the tape is driven by a toothed sprocket drum, whereby exact registry and synchronization of a picture film strip with the sound channel is maintained in any part of the reel, and identical footage of each medium passes its respective transducer in unit time. The advantages obtainable by practice of the invention may be appraised by considering that the facility of magnetic recording and reproducing with high quality with simple equipment is practicable for even the 8 mm. film used with home movies, while for professional and studio work with 16 mm. and 35 mm. film strip the simplicity of registry, indexing, editing, cutting, and splicing of the separate media greatly facilitates handling and reduces cost.

It would appear at first glance that the problems of tape velocity stabilization would be resolved in the same manner as in prior art film strip transport mechanisms. However this has been found not to be the case for when resort is made to prior art techniques for transporting a fixed loop of such tape under tension driven by a powered sprocketed drum past translating heads, pronounced variations in speed are experienced.

The problems attending the handling of continuous strip sound record media where it is required that the permissible speed variations not exceed a low figure have received considerable attention heretofore. Solutions of this class of problem are discussed in an article, "Analysis of Sound-Film Drives," in the Journal of the Society of Motion Picture Engineers, vol. 37, November 1941, pages 452–479. It is clear from a study of the prior art that in order to achieve low variations from a uniform velocity of a continuous strip or tape sound record, the transport mechanism must include high quality mechanical filter devices such as will attenuate to a minimum the effects of varying drive speed, physical shocks and other disturbances affecting velocity or tension of the tape or strip as it passes a head. Prior art attempts to reduce drive disturbances causing variations from constant speed of a moving strip have generally resorted to weighted drums or idler rollers engaging the strip, idlers damped by dashpots or resistive damping, or liquid flywheel damping in apparatus where the lay of film engages such flywheel in the vicinity of a translating head. Several prior art system have relied on the flexing of the strip to smooth out the drive irregularities, the lay of strip being arranged in a U or S shape to provide the element of compliance in the mechanical filter.

In so far as applicant is aware, there has not heretofore been any successful solution of the problem of stabilizing to a very high order the velocity and tension of a tensioned fixed loop of a narrow, thin limp tape having a polyester base such as that sold under the trade name "Mylar" and having a magnetic coating, as supplied commercially by the Reeves Soundcraft Corporation. The adaptation to the handling of such tape of known transport mechanism of the type comprising a driving sprocket engaging lays entering and leaving the tight loop and including a weighted frictionally-engaged flywheel and lay-engaging idler rollers contributing compliance, has not been found to meet the rigid specifications for minimum flutter in master sound track recording and reproducing. As will readily be understood by those skilled in the art, the effects of flutter become more serious in proportion to the frequency under consideration, and it is required to achieve high fidelity of sound track extending well above 10 kilocycles per second.

Owing to the extreme limpness of the magnetic tape medium its contribution of compliance when in flexure is relatively ineffectual. Moreover due to the linear stress-strain characteristic of the tape base material, such a tight-loop transport mechanism displays objectionable low-frequency hunting or oscillation, wherein the tank elements comprise inertia of rotating parts and compliance of spring-pressed idlers. The use of resistive damping or dashpot damping of idlers has been found inferior in results as compared with the particular arrangement of spring-pressed idlers according to the invention wherein a viscously deformable body provides rapid decay of oscillations. Moreover the apparatus according to the invention avoids limitations as to direction of travel of the tape and moreover permits of rapid reversal of drive for which prior art transport mechanisms make no provision.

In carrying the invention into effect, a loop of tape is arranged to be yieldably engaged by a viscously damped stabilizer assembly having compliance and effective to maintain constant tension of the tape, wherein the stabilizer is restricted to movement maintaining a substantially constant tension and velocity in a lay engaging two freely rotatable flywheel masses of relatively high angular moment of inertia frictionally driven by the lay and the loop is driven at a remote point by the sprocket, whereby the lay engaging a transducer located between such flywheels exhibits substantially uniform velocity. Recording the reproducing of sound by a separate magnetic tape in precise registry with a picture film and with a quality of high order is made possible through the use of apparatus incorporating such stabilized tape transport and sprocket drive arrangement and including a transmission and coupling mechanically interlocking the sprocket drive and the drive for the film strip.

The invention is set out also in respect of a construction permitting both recording and reproducing of sound to be effected by means of an embodiment which is physically portable and which may be readily fitted to a motion picture camera or a projector as an accessory or as driving unit for such projector or camera.

It is also the purpose of this disclosure to describe an embodiment of the invention whereby a continuous perforated magnetic tape member is transported in a tight loop under substantially constant tension and the lay of tape engaging transducers has constant and unvarying rate of displacement.

It is the further purpose of this description to disclose a unitary self-contained recording and reproducing apparatus employing a sprocket-engaging limp magnetic tape record medium and drive means therefor establishing positive metered drive of the tape at substantially unvarying velocity in relation to transducer means and in exact registry with a separate film strip.

Yet another feature set forth hereinafter concerns provision of reversing drive for a tight loop of tape and an automatically reversible drive for a take-up reel.

Other features and purposes of the invention as expressed in the embodiments described will be apparent from a reading of the specification and study of the drawings attached, wherein.

Figure 1:
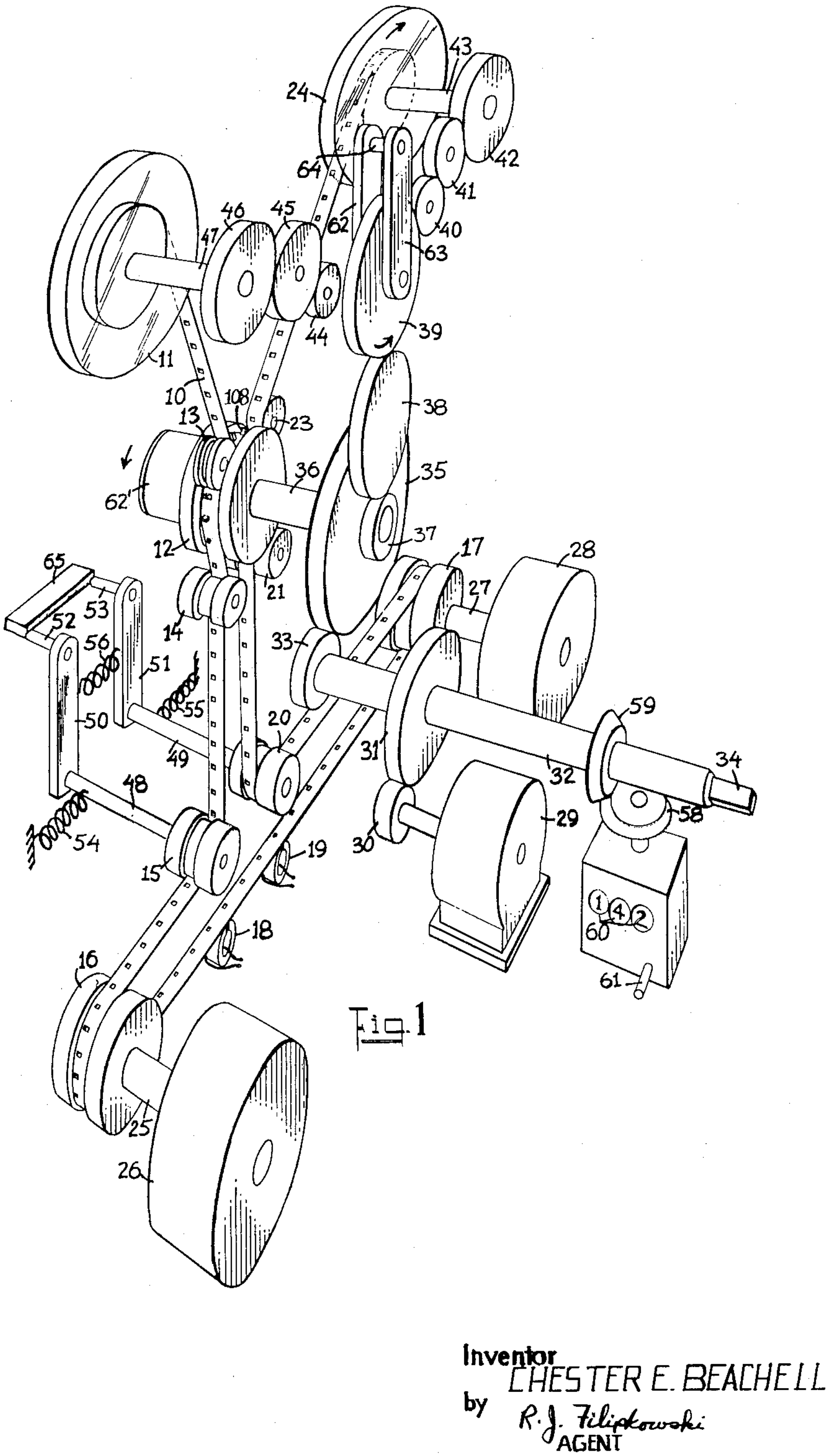
FIGURE 1 is a generalized phantom perspective view of an embodiment including tape storage reels and drive therefor and showing the tight loop transport and stabilizing mechanism.

Turning now to FIGURE 1, there is illustrated an embodiment of the invention in perspective schematic form showing relations of drive elements and tape transport mechanism, and wherein certain elements such as the frame, retaining rings, bearings, and the like have been omitted for clarity of presentation. It will be seen on tracing the lay of the tape 10 in this diagram that the tape moves from take-off reel 11, is fed into and returned from a tensioned fixed loop, and is wound upon take-up reel 24. A particular element of the tape may be followed as it progresses from reel 11, under a toggling gate 13, over an arc of the sprocketed drum 12, then under retaining idler 14 and thence vertically downward, being bent in a right angle turn under stabilizing roller 15 to frictionally engage disc 16 by an arc of substantially 180 degrees. It then passes laterally to engage a further disc 17 similarly, making contact with one or more transducers such as 18, 19 positioned along the lay. After passing disc 17, the lay bends in a right angle bend about stabilizing roller 20 and continues upwardly to fixed idler 21, engaging an arc of sprocket 12 on the side opposite to the entering lay. Positive drive imparted to reel 24 tensions the lay leaving the sprocket as it passes under toggling idler 23 to be wound up on the reel 24.

With the mechanism operating to observe the sense of rotation as indicated by arrow markings, the lay passing the heads 18, 19 moves from left to right causing anticlockwise rotation of disc 16 as viewed from the flywheel side, and also of its shaft 25 and flywheel mass 26 carried thereon. Similarly, like disc 17 and its shaft 27 and flywheel 28 are rotated at like rotational velocity. The driving source of power is constant speed motor 29 which may be of any suitable type such as spring clockwork, electric, hydraulic or pneumatic, and which may have its direction of rotation reversed. Drive pinion 30 on the motor shaft engages gear 31 to drive the latter in step-down ratio causing rotation of shaft 32 and gear 33 fixed thereto at lesser angular velocity. A squared end 34 on the latter shaft is provided to serve as a coupling for driving ancillary equipment such as a camera, projector, printer or other film strip handling apparatus. Shaft 36 upon which the sprocket 12 is fixed is driven from the gear 33 by way of step-down gear 35. Upon the same shaft 36 there is mounted a frictionally-driven slipping gear 37, which engages gear 38 of a drive gear train to impart drive to one or the other of the reels 11 and 24, depending upon the sense of rotation of shaft 36.

In the drawing it will be observed that the sense of rotation of gear 38 is such as to swing the idler 39 about a center located in axle 64 in the upper ends of links 62, 63, in whose lower ends the idler is journalled. The idler is maintained in the engaged condition with gear 40 as long as the sense of drive remains in the direction indicated. Consequently gear 42 receives drive from intermediate idler gear 41, to rotate shaft 43 clockwise and accordingly to reel up the slack tape leaving idler 23. It is arranged that the reel 24 is overdriven with respect to the tape positively fed by the sprocket into and out of the loop, and it is provided that gear 37 is frictionally engaged by shaft 36, supplying drive only as required. A reversal of the direction of drive of motor 29 produces a clockwise rotation of gear 39, which results in the immediate disengagement of the gear from gear 40, and causes the transfer gear 39 to engage intermediate idler 44. While a large clearance is shown between the transfer gear and a disengaged idler for purpose of clarity, the clearance of gear 39 is arranged to be just sufficient to establish that neither the left hand gear 44 nor the right hand gear 40 will be energized but so that the tips of their teeth are touching the teeth of gear 39 when it lies precisely midway between them. In practice the swinging idler is always in engaged position with one or the other of the trains 46, 45, 44, or 42, 41, 40. In the reverse drive condition shaft 47 is energized for anticlockwise rotation whereby reel 11 takes up the returning tape.

The stabilizing mechanism, whereof idler elements 15 and 20 have been referred to as engaging the loop of tape, comprises arm elements 48, 49 upon the ends of which these idlers are respectively journalled, to lie in the plane of the loop. The arms respectively pivot about centers in axles 52, 53 journalled in a frame (not shown) and passing through the upper ends of the arms. A pair of springs 54, 55 in tension are arranged in line to pull the arms 48, 49 apart, against the tension of a spring 56. The latter is preferably positioned closer to the line joining the axles 52 and 53 than are the springs 54, 55, and is proportionately of a higher spring constant than the latter pair. In the static condition and in the absence of any loop of tape, arms 50, 51 take up a rest position close to each other as determined by adjustment of spring tensions. When the loop is engaged the lays are under moderate tension due to deflection of the shafts 48, 49 outwardly from the rest position. The loop which is thus placed in tension includes lays extending between points on opposite sides of the sprocket drum 12 engaging idlers 15, 20, and passing between the latter and respective discs 16, 17, and a lay extending between the discs in transducing relation with heads 18, 19.

A body of a viscous yieldably deformable material 65 having solid form and negligible resilience is coupled with one or both of the arms 50, 51 to resist oscillatory rotation of the stabilizing idlers about normal operating positions. Any tendency of the system to accelerate the tape velocity produces a swing of the idler arms and a consequent damping effect, as will be described more particularly hereinafter.

An exemplary embodiment of the invention will now be described, comprising a transportable self-contained assembly generally indicated at 141 in FIGURE 11, adapted to be physically associated with a cinematic camera 155 for sound track recording. Such camera equipment forms no part of the present invention per se, and may take any suitable form. A set of bosses 156 associated with the sound unit secure the latter detachably against the side of the camera, and shaft 34 mechanically interlocks the film strip drive mechanism with the drive for the tape unit. A light proof film magazine 159 surmounts the camera unit, and a light shield 160 protects the lens assembly. The entire equipment may be mounted in standard fittings atop a tripod 157, and the camera may be aimed and controlled in direction by a lever 158. As will appear more directly from FIGURES 2 and 10, a tape reel magazine rests on the upper surface of a casing 66 and extends through an opening in the outer housing 67. To avoid magnetic field disturbances, such housing and casing are preferably of a non magnetic material, such as magnesium alloy or brass, or aluminum.

A typical field type of sound unit according to the invention therefore provides a separable reel magazine including pair of reels 11, 24, a hold down bolt 82, outer casing 67, hinged door 69, and anti-shock suspension mountings 68 between the casing and the housing. Amplifier means and batteries (not shown) may be carried in the base, and a control panel may be provided including volume control 75, filament and high tension supply switches 73, 74, and electrical cable and microphone circuit sockets 71, 72. Preferably door 69 includes a glassed area to permit inspection of the lays of tape without exposing the mechanism to the weather. For the reason that any permeable materials such as iron, nickel, or steel in contact with the tape or close thereto may affect the record the construction is realized so as to minimize or avoid in so far as possible use of these materials. For example, where an electrically powered drive system is used, motor 29 is remotely located with respect to heads 18, 19.

Figures 4, 6, 11, 22:
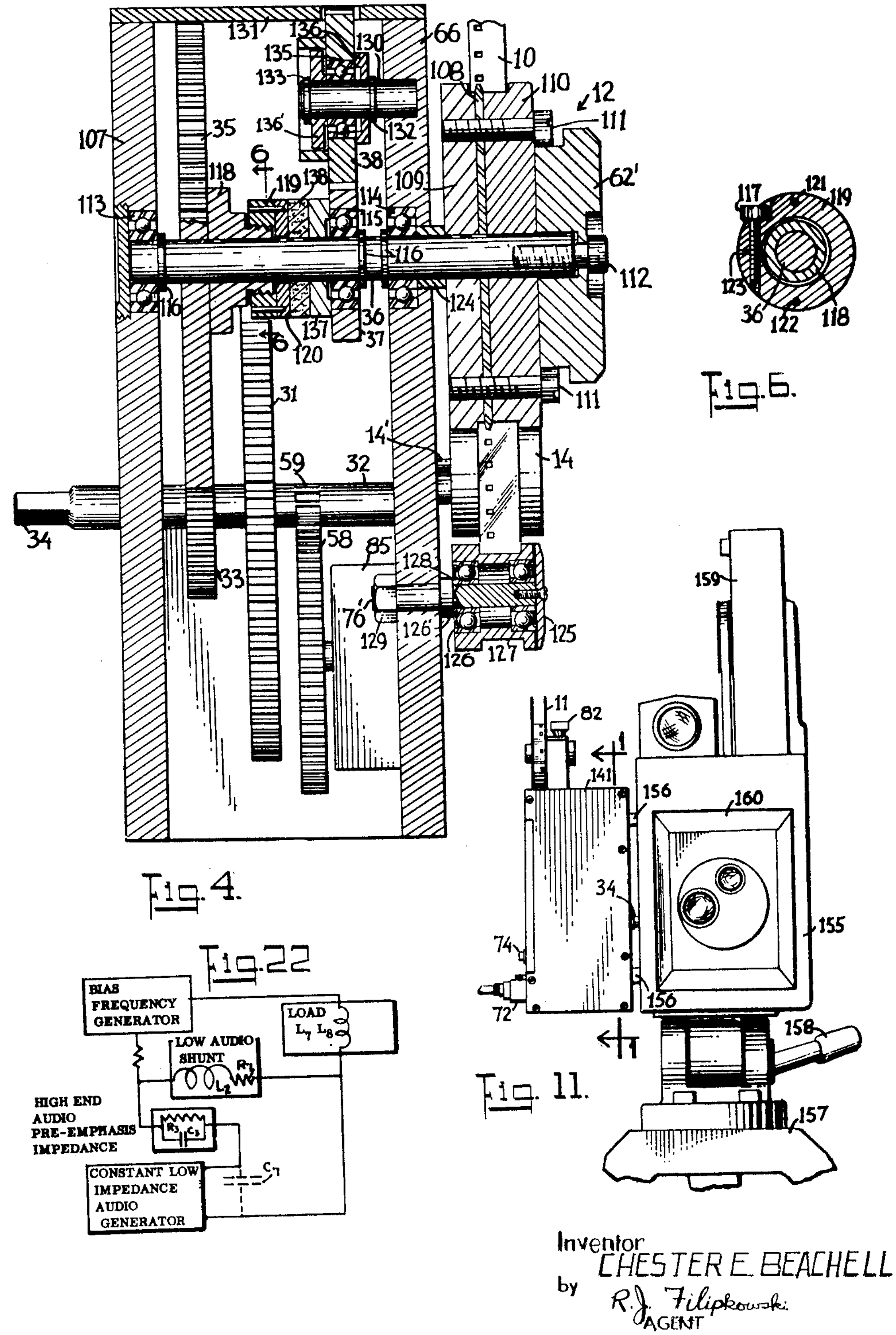
FIGURE 4 is an elevation in section taken on the line 4—4 of FIG. 2; showing the sprocket gear trains, and take-up clutch.
FIGURE 6 is a section through the clutch of FIG. 4 along line 6—6.
FIGURE 11 is a front elevation of a portable magnetic recording unit employing sprocketed tape in association with a motion picture camera; and, FIGURE 12 is a schematic diagram of a circuit for energizing a recording head.
Figure 5:
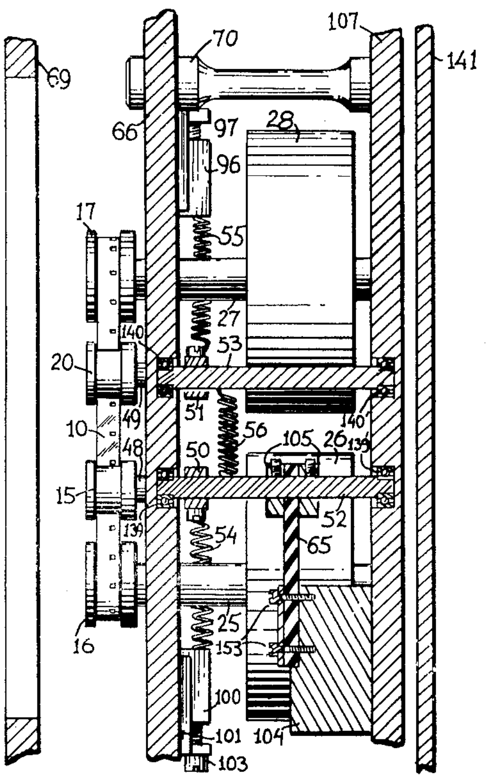
FIGURE 5 is an elevation view in section taken on a plane through the unit of FIG. 2 along the line 5—5.

The construction of the unit may be understood by reference to additional FIGURES 4 and 5, wherein it will be seen that a front plate 66 and a rear plate 107 are parallely spaced to form enclosing walls of a box-like casing or frame for the support of elements. A top plate 131 is disposed at right angles to the plates 66 and 107 and serves to support the reel magazine frame 163. Rigid assembly of the plates to pre-determined spacing is provided by bolts 70 having shoulders against which the inner faces of the parallel plates bear. Flywheel shafts 25 and 27 are journalled in bearings (not shown) in the plates, and a projecting length of each axle extends through plate 66 to the front side, on which side flanged discs 16, 17 are affixed to the shafts. The manner of assemblying such shaft and bearing structure may be understood by referring to the mounting of the sprocket drum shaft 36 in FIGURE 4.

A sprocket drum 12 fixed to shaft 36 outside of the casing comprises a pair of flanged discs 109, 110 having portions of reduced diameter whereby in the assembled form there is provided a cylindric drive drum with straight-sided flange walls defining the width of a groove in which tape 10 freely lies. A thin sprocket disc 108 is coaxially held between the discs 109, 110 and carries a number of regularly spaced teeth of evolute form, the pitch circle whereof lies at a radius equal to the groove radius. For 0.002 inch thick and 0.250 inch width, the teeth rise approximately 0.060 inch above the cylindric surface but do not extend as far as the onuter face of the flanges referred to. As illustrated the sprocket holes are set closer to an edge of the tape than to the center thereof, and the sprocket disc 108 is spaced accordingly. For effective laying of the tape in the groove, the radius of the groove adjacent the edges is slightly reduced so that the edges of the tape are unsupported for a distance of about 0.015 inch inwardly of the sides of the groove.

In order to avoid magnetic disturbance of the tape in the effective area provided, disc 108 is preferably of stainless steel in its hardened form and non-magnetic in character.

A number of bolts 111 secure the drum assembly together and the whole is secured to shaft 36 either by keying thereto or by assembling as a press fit. A manual handling knob 62' is attached to the forward side of the sprocket drum to permit setting of the loop by hand, the knob being likewise secured to the shaft 36.

Main bearings 113 and 114 in the rear and front plates respectively are high quality ball bearings preferably of the sealed type, the seals having been omitted in the drawing for clarity. Retaining spring arc rings 116 restrain endwise movement of the shaft with respect to the frame. Bolt 112 engages knob 62' to compress the drum axially against spacer 124 which in turn bears against an arc ring resting in a groove in the shaft. It will be seen that a shaft of uniform diameter is used, requiring only the grooving for retaining rings. An assembly locking disc is threadedly received in the rear plate to bear against the outer race of the bearing, whereby to adjust end play precisely.

Referring again to FIGURES 2 and 3, it will be observed that an idler 76 is employed in addition to idlers 14 and 21 to permit a 90° change of direction of the lays. All three idlers are freely rotatable on ball bearings riding on respective fixed shafts 76', 14', and 21'. Description of idler 76 as in FIGURE 4 section will be understood to relate equally to the remaining two whose construction is identical. Idler 76 is bored to receive outer race of ball bearing 127 which bears against a shoulder formed by a bore of reduced diameter. The outer race of ball bearing 126 likewise bears against the opposite shoulder of the bore, while the inner race 126' bears against a shoulder 128 formed on shaft 76'. Shaft 76' is threaded adjacent its outer end to receive a fastening nut 129 while a portion of reduced diameter beyond the shoulder is received within the inner races of the ball bearings referred to. This reduced diameter portion projects slightly beyond the ball bearing 127, and a disc 125 is held against the shaft end by a retaining screw received in a threaded axial bore.

Figure 3:
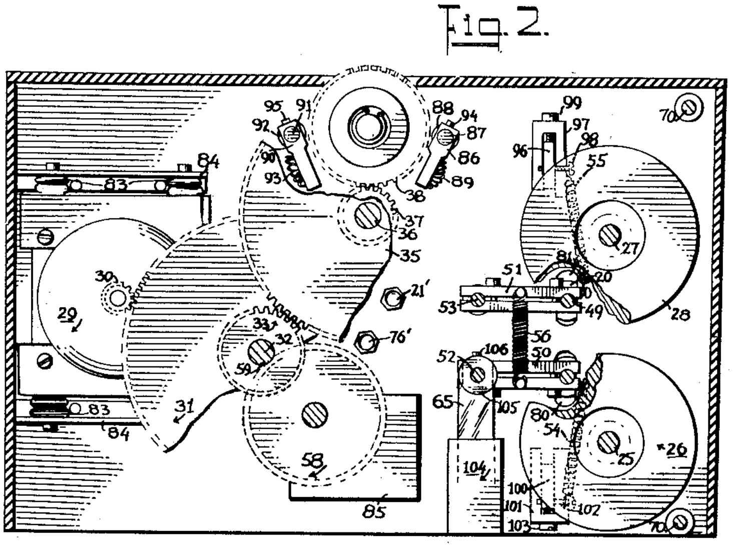
FIGURE 3 is a vertical section taken parallel to the front plate as indicated by the line 1—1 of FIG. 11.

Shafts 48 and 49 upon whose outer ends stabilizing idlers 15 and 20 are journalled are not fixed, but are supported as will appear in FIGURES 3 and 5 at the ends of links 51 and 50, which have their other ends secured to respective shafts 53 and 52, the latter being journalled in bearings retained in the plate. Links 51 and 50 comprise pairs of bars clamped upon their pivot shafts by the action of suitable bolt fastening devices. Shafts 48 and 49 extend through plate 66 and move freely in slots 80, 81. In the normal condition when a lay of tape is engaged by the idlers the positions of the links are parallel and the shafts extend through the slots at approximately their median positions. A coil spring 56 under tension is secured by its ends to the two links at approximately their median length positions, and other springs 55, 54 are respectively joined by their ends between the frame and an end of link 51 and link 50. The latter springs are somewhat longer and have a considerably smaller spring constant than 56. Tensioning means for spring 55 comprise a yoke 97 secured to the inner face of plate 66 having a vertical guide slot formed therein to receive a block 96 reciprocable along the slot and guided therein. A bolt 98 threadedly secured in block 96 is connected with the end of spring 55, and adjusting screw 99 adjusts the spring tension by regulating the position of the block in the guide. In a like manner screw 103 in lower guide 101 positions block 100 to correspondingly move bolt 102 upon which the end of spring 54 is made fast. The other ends of the springs engage suitable machine screws in the ends of links 51 and 50 respectively.

Figure 2:
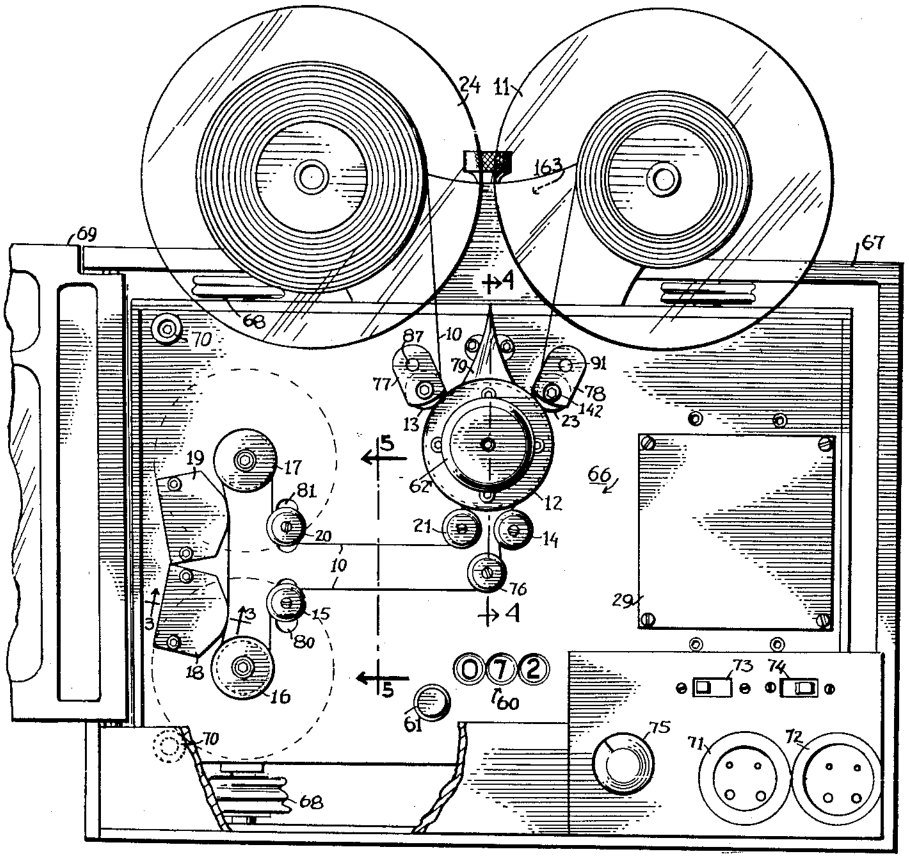
FIGURE 2 is a front view of a portable record/reproduce sound unit in an embodiment adapted for portability in the field.

Drive for the loop of tape is by a motor 29, indicated in FIGURES 2 and 3, of constant speed type. This may preferably be an alternating current motor of synchronous type, or a D.C. motor having speed stabilizing means associated therewith. As indicated previously, the invention is not restricted to electrical powered means, and for miniature and portable units may be provided with other types such as spring wound, flyball-governed motor means. Support for the motor comprises two shelves 84 extending between front and back plates and secured thereto, upon which sets of shock mountings 83 are mounted and from which latter units the motor proper is suspended.

Shaft 32 in the transmission is driven at a lower speed determined by the ratio of gear 31 to gear 30, which in the present example provides speed reduction of 10:1. Where motor 29 has an operating speed of 1800 r.p.m. shaft 32 operates at 180 r.p.m. This shaft is adapted to couple with a drive shaft in a camera, projector, or printer associated with the sound unit, wherein, for example, such drive shaft is part of a transmission including a shutter shaft running at 1440 r.p.m. for 24 frames per second image handling. While in the present example the intermediate shaft is selected to run at 180 r.p.m., any other speed suitable for coupling with the drive system of an ancillary equipment may be chosen. Where the ancillary unit runs at a speed of 16 frames per second, as in many "silent" cameras, and in the usual 8 mm. and 16 mm. amateur camera, the speed of shaft 32 may be chosen as a sub-multiple of 960 r.p.m. It is also contemplated that a separate adaptor unit comprising a gear box may be associated between units to accomodate the sound unit to non-standard drive speeds.

All gears in the transmission are preferably of the fiber type, except for gear 30 which is of "nylon" or "Teflon," and in general for good design practice will be selected from 48 pitch or higher pitch value glass. While straight cut gears are shown it is also contemplated that spiral cut or herringbone gears may be employed.

Sprocket shaft 36 driven from large gear 35, having a speed in the present instance of 72 r.p.m., includes a slipping clutch drive between the shaft and gear 37, which latter gear engages intermediate idler 38 for driving the take-up reel. As will be evident in FIGURE 4, a boss 118 on gear 35 has a cylindric axial extension threaded to receive a collar 119. Referring additionally to FIGURE 6, a disc 120 in pinned by short pins 121 and 122 which do not pass through the disc and which are secured in the collar. A dry felt washer 138 is adjustably compressed between disc 120 and a straight-sided boss 137 integral with gear 37, by the axial position of collar 119. The latter is split and includes setting screw 117 for tightening the collar to the boss 118 when the desired degree of compression of the felt washer has been attained. Consequently as gear 35 and shaft 36 are driven, a frictional drive is imparted to the gear train 38, 37. A retainer ring 116 holds the inner race of ball bearing 115 against the axial clutch pressure.

Figure 10:
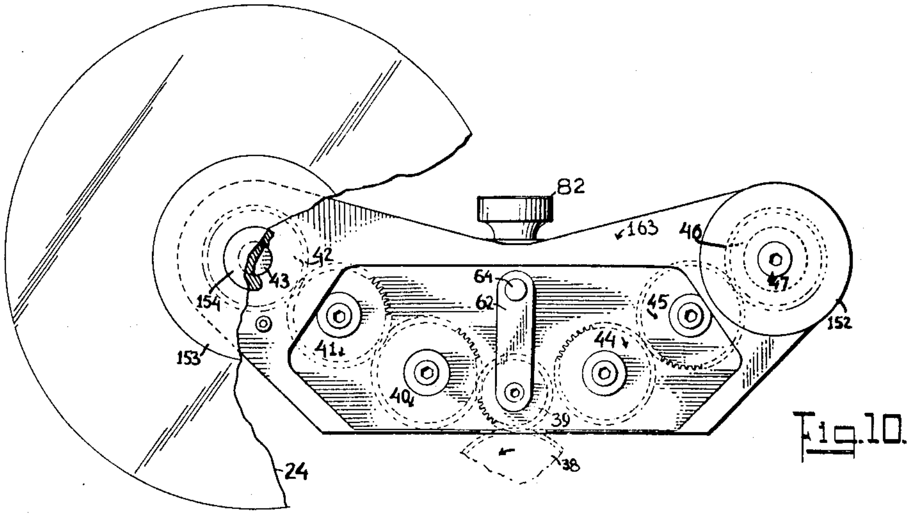
FIGURE 10 is a view of a detachable reel magazine with the cover removed to show gear trains and a swinging transfer gear.

A stub shaft 130 pressed into plate 66 and normal thereto supports ball bearing 135, whose inner race and outer race are respectively retained by separators 136' and 136, retained on shaft 130 by rings 133 and 132. It will be seen that the gear 38 extends through the top plate 131 of the casing, and as shown in FIGURE 10, engages transfer idler 39 of a take-up drive train.

A supporting frame 170 in the reel magazine includes two gear trains respectively driving shafts 43 and 47 whereon reel supporting discs such as 152 and 152', are secured. Those skilled in the art will readily appreciate that any suitable means may be incorporated to detachably mount a reel on a drive axle fitted with a collar permitting removal of the reel axially thereof, such attaching means comprising, for example, a spring key (not shown) seated within a boss 154 in the reel 24. To facilitate reel changing and mounting it is preferred to employ the novel reel latches described hereinafter in association with inserts for the drive shafts 43 and 47. In the diagram, reel 24 is shown as the take-up reel, being driven anticlockwise, as is idler 38, for clockwise rotation of sprocket drum 12, as viewed from the front. Idler 39 is journalled in the lower end of a link structure including strip 62, the link structure pivoting about an axle 64 held in frame 170. The effect of anticlockwise rotation of gear 38 which constantly engages idler 39 with the magazine correctly in position, is to swing the idler and link structure to the left, whereupon idler 40 is driven, and the teeth of idler 39 are retracted clear of the teeth of idler 44 of the alternate gear train. Gears 40, 41, 42 and gears 44, 45, 6 are suitably realized as fiber gears, journalled on axles set into the frame 170 and including permanently lubricated sleeve type bearings. It is not necessary to employ ball bearings for this purpose, although axles 47 and 43 may advantageously be so fitted. When the sprocket drum is rapidly reversed in direction of rotation, the effect of friction upon the train of gears disengaged by idler 39 is to prevent the momentum of a full reel from spilling out tape. As will be more particularly set out hereinafter, an adjustable drag clutch is alternatively fitted on shafts 43 and 47 to prevent inertia of large reels from running free unduly.

Figure 7:
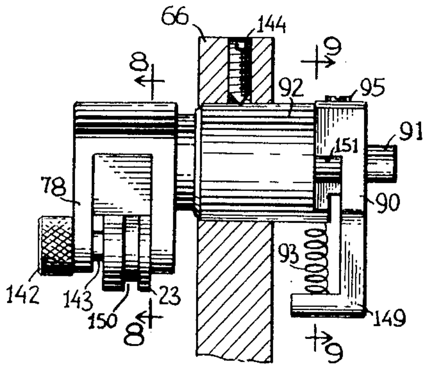
FIGURE 7 is a view partly in section showing an idler roller for laying tape onto a driving sprocket; and a toggling gate.
Figure 9:
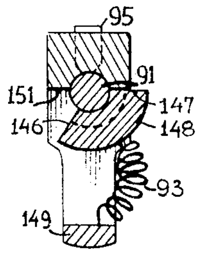
FIGURE 9 is a section through the body of FIG. 7 taken on a plane designated by line 9—9, showing limit stop means for the toggling gate.
Figure 8:
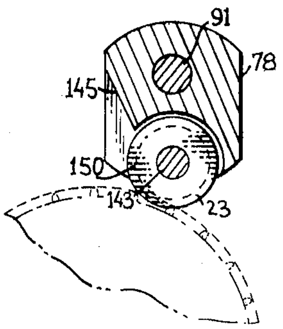
FIGURE 8 is a section taken on a plane indicated by line 8—8 of FIG. 7.

The guiding of tape into the groove of the sprocket drum has been found to be critical as to the disposition of the idlers 13 and 23, in their capacity as guides for a lay entering the groove during forward or reverse drive. Referring now to FIGURES 7, 8, and 9, these idlers are carried in mountings 77 and 78 visible in elevation in FIGURE 2, whereof only the mounting 78 for idler 23 will be described, the construction of the other being similar. A shaft 91 is journalled in a cylindric plug 92 set into a hole bored in frame 66, and secured therein by set screw 144. Mounting 78 is suitably affixed, as by set-screw (not shown) upon the outer end of the shaft, and a button, 142 is secured to the mounting for purposes of manipulation. A polished steel shaft 143 parallel with shaft 91 extends through the lower end of the mounting, supporting a roller 23 which is bored smoothly for free rotation on the shaft. A peripheral groove 150 is cut in the face of the idler, for the purpose of allowing the sprocket teeth 108 to pass freely within the groove when the idler is swung into guiding position, the relative positions of mounting 78 and sprocket 108 when so disposed being indicated at FIGURE 8. The width of roller 23 is slightly smaller than the width of the groove in sprocket drum 12, to permit the free entry of the idler between the sides of the groove. The inner end of plug 92 includes a stepped projecting portion 148 whereof the steps are bounded by two cylindric surfaces of different radii, and by radially disposed plane surfaces 146, 147 disposed at a predetermined angle. Carried upon the inner end of shaft 91 and pinned thereto by set screw 95, is a toggle arm 90 milled transversely of its length to form a channel whereof a wall 151 lies through the bore in the arm in which shaft 91 is received. Wall 151 is effective to determine the position of idler 23 relatively to the groove of sprocket drum 12, defining a first limit position when face 146 rests against the wall and a second limit position when face 147 abuts thereagainst. Spring 93 under compression has an end retained in body 92 and is secured at its other end to a toe 149 integral with toggle arm 90. In the view of FIGURE 9, a wall 151 bears against stop face 147 on body 92, to determine the clearance between idler 23 and the groove surface in sprocket drum 12 with the idler in guiding position. The mounting 78 may be swung anticlockwise, whereupon the action of the spring will be to force the arm 90 positively in the direction whereby idler 23 clears the drum and the mounting rests with face 146 bearing against the wall in arm 90. Similar provisions are made in the mounting 77 and for the control of its idler 13.

In operation, the settings of mountings 77 and 73 are adjusted so as to provide a clearance of about two tape thicknesses between the drum groove and the nearest part of the idler. This may be as much as four tape thicknesses in practice, or 0.008 inch, but a clearance positively larger than the tape thickness must be provided or the tape will not ride in the groove if it is squeezed between the idler and the drum.

Mountings 77 and 78 are both formed with relieved portions as indicated by face 145 in FIGURE 8 on the tape side of the mounting to avoid interference with the lay of tape between the idler and the reel. A guide 79 located above the sprocket drum 12 and closely positioned thereto is provided to avoid the chance of tape falling loosely on the sprocket teeth. In a practical embodiment it has been found that with the tape properly stripping from the teeth, there is little if any contact between a tooth and the perforation once the tape has lifted from the drum groove.

Suitable material for the rollers 13 and 23 has been found to be polytetrafluoroethylene, as sold under the trade name "Teflon" since it has properties whereby it remains clean, and makes a satisfactory bearing for itself against polished steel, particularly for the very light loads to which it is subjected in guiding the tape.

The operation of the drive system may now be described for the exemplary embodiment illustrated. Presuming that a camera is in readiness and in mechanical interlock relation with the sound unit, footage registers (not shown) such as are customarily associated with the camera, and register 60 of the sound unit will be normally read and the readings recorded, or both may be adjusted to zero. Button 61 associated with counter 85 is provided for changing the indicated value, by clutch means well known in the art. At this point it may be observed that a positive drive from shaft 32 by way of integrally cut gear 59 is provided for gear 58, whereby the counter is driven in proportion to tape fed through the loop. If now it is desired to record and the circuits are suitably prepared as by applying filament heating supply and high tension operating voltages to amplifier apparatus, a motor control (not shown) is operated to start the drive. Assuming for purposes of description that motor 29 is arranged in driving relation to both the drive for a camera as well as for the sound unit, the film strip will consequently be driven, and sprocket drum 12 will also rotate causing the loop of tape to move. At the instant of starting, due to the inertia of the rotating parts and particularly of the flywheel masses 26, 28, the lay of tape passing from flywheel disc 16 towards sprocket drum 12 (assuming anti-clockwise rotation of the latter) will be tensioned above normal operating tension. Consequently idler 15 will be pulled downwardly along slot 80 to relieve the tension somewhat, while the applied torque to discs 16 and 17 accelerates these towards running speed. The positive feeding by the sprocket of tape advancing into the portion of the loop which extends from idler 21 to idler 20 causes this side of the loop to momentarily slacken, allowing idler 20 to move downwardly in sympathy with idler 15. The excursion of the stabilizing idlers is a transient effect, as when the spring system biassing the idlers has stored a certain amount of energy it tends to be returned to the system as the flywheels approach their normal running speed. Consequently the idlers will restore towards their normal operating position and will overshoot this position, as the flywheels momentarily exceed running speed. To prevent recurring swinging of the idlers and sinusoidal variation in rotational speed of the flywheels, a body 65 of a viscous deformable plastic, such as polyvinyl butyral is coupled to the link on the takeup side of the loop. In FIGURES 3 and 5, it will be seen that a strip of this material of rectangular cross section is secured as by clamping its lower end by means of a plate secured by bolts 153 to block 104 fixed to the flame, while the upper end is restrained by and engaged with an assembly of two discs 105 whose inner faces are channeled to enclose the strip. As shaft 52 rotates in accordance with the deflection of idler 15, the strip 65 is subjected to stretching along one edge and compression along the other longitudinally of its length, to which strains it opposes a resistance due to shear stress developed in the body. The nature of the material is such that it lacks resilience and in time will flow to relieve stresses to which it is subjected. It may therefore be understood that such material is effective to damp any application of sudden forces tending to deform it, particularly reversing forces. In the present embodiment, its effect in response to the oscillatory deflections of the stabilizers about a normal rest position is to rapidly damp out the swings, whereby the apparatus steadies within one cycle of the oscillation, as has been observed to be within a period of about one second.

It is highly desirable while the recording is proceeding to monitor the actually recorded track in the tape, for which purpose there is provided a head 18 in the capacity of monitor and playback head, in addition to the recording head 19. Suitable headphone or other listening device 165 is supplied with sound signal from amplifier 164 to which head 18 is operatively connected as in FIGURE 12. It will be understood that both heads 18 and 19 are correctly positioned to align their gaps with reference to a standard direction and in registry with the track along the tape, preferably by means to be described hereinafter.

Figure 12:
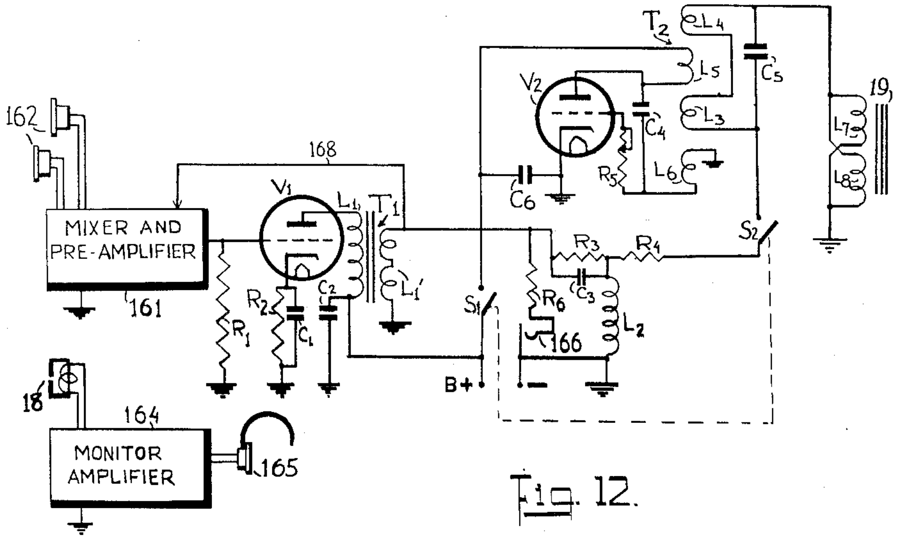

A recording head energizing circuit particularly suited to the operation of a portable unit for high quality professional recording is described with reference to FIGURE 12. In this diagram sources of sound such as microphones 162 associated with the recording unit are connected to mixer and pre-amplifier unit 161, which may physically be mounted in the casing 67 with its supply sources in the form of batteries, or received by cables connected to plugs 71, 72. When switches S1, S2 are closed, the bias oscillator tube V2 is energized and the output of final audio amplifier stage tube V1 is connected through a filter circuit to the recording head 19, by way of a modulation transformer generally indicated at T2. Output tube V1 includes an input coupling grid resistor R1, a cathode bias circuit R2 and C1 in parallel, and output transformer T1, the latter comprising a high impedance primary L1 and a low impedance secondary L1′. The recording amplifier is stabilized by a feedback loop indicated by the path 168, in the manner well-known in the art of negative feed-back. This obtains the advantage of substantially constant low impedance output. An audio signal equalizing circuit comprises a network including resistor R3 shunted by C3 and a series resistor R4, with a branch arm comprising a resistive inductor L2. Provision is made for monitoring the recording amplifier output including jack 166 in series with resistor R6.

Bias oscillator tube V2 will be seen to be a modified Hartley oscillator, wherein plate coil L5, grid coil L6, and capacitor C4 determine the oscillatory frequency, which in the present example is adjusted to 60 kilocycles per second. A two-winding tank circuit L3 and L4 paralleled by C5 is likewise tuned to the bias frequency and is inductively coupled with the oscillatory circuit. The tank circuit is connected in series between the audio output voltage supplied from the low impedance L1′ of transformer T1 secondary and the windings L7, L8 of recording head 19. Large values of capacity are employed in C2 and C6 to avoid feeding of bias and audio voltages through the supply B+. Oscillator output voltage is adjusted by means of variable resistor R5.

The electrical circuit described has been found to gain a number of advantages. It combines into a single composite signal both the audio A.C. voltage and the constant amplitude 60 kc. biassing voltage, which are applied to the paralleled windings in head 19. The bias oscillator is not loaded by the output of the recording amplifier, nor is the recording amplifier loaded by the interaction with it of the bias oscillator through a common bus or impedance. This avoids the defects apparent in a system using capacitor injection of a bias frequency voltage into a head winding, wherein the high frequency components of the audio signal, particularly those above about 10 kc. per second, are attenuated. It is well known that for longitudinal recording on a tape moving at relatively low speed it is necessary to emphasize the highs hence such attenuation is objectionable. The combining circuit chosen in the present system may be shown to largely avoid adverse effects on high audio components, and provides remarkable economy of supply.

Referring now to FIGURE 22, the schematic diagram shown therein describes the relationships of the respective generators, the load presented by the recording head, and the impedances employed for obtaining high audio pre-emphasis. The bias frequency generator, while having a parallel resonant tank circuit, is effectively a very low D.C. resistance to its own frequency. The load at which it is desired to dissipate energy delivered from the bias frequency generator, has very high relative impedance, due to the inductance of the windings, as well as their resistance, and due partly to the coupling with the coating in the magnetizable tape. At a frequency of 60 kc. per second the impedance of the head is several times the sum of all other impedances in the loop carrying the bias frequency current. The audio frequency generator, which in this instance is the output section of the recording amplifier, is effectively a low impedance source at any frequency in its range, and is stabilized by virtue of large negative feedback being employed between the output and an input stage. At the same time, owing to the inherent capacity of the transformer secondary, as well as the output cable, there is a low impedance shunt path presented to the bias frequency current in the load loop. By virtue of the fact that the bias frequency oscillator has relatively low values of inductance and capacity forming the resonant circuit, this generator has low series impedance to audio frequency currents.

For saturating drive of the head windings at all audio frequencies without overdriving at low values, the feed system according to the invention includes series and shunt impedances to audio frequency currents, so chosen as to shunt the lower audio frequency currents around the head, and to accentuate or emphasize the highest useful audio frequencies. The desired energizing current-versus-frequency characteristic at the head has been found to be a moderately emphasized low frequency peak extending to about 1500 cycles, reducing to a steady value up to about 7 kilocycles per second, and then rising at an increasing rate to about 11 kc. per second. It will be understood that the foregoing is intended for 16 mm. film sound with tape speed matched thereto, as described earlier. The series impedance comprising resistor R3 and shunt capacitor C3, and the series resistance R4 were chosen in one specific embodiment with the values respectively of 4700 ohms, 0.01 microfarad, and 140 ohms. L2 is a 53 mh. choke having relatively low resistance. The reactances of C3 and L2 at about 9500 cycles per second form a series resonant path with the load effectively paralleling the inductance.

At low audio frequencies, i.e., below 100 cycles per second the shunt L2 serves to bleed current around the head, whereby a pre-determined portion energizes the gap without over-driving. As the audio frequency is raised, the shunt inductance presents an increasing impedance while the series capacitor carries more current, bypassing the relatively high resistor R3. At the high end of the audio range, the current is affectively entirely dissipated in the head, thereby providing a pre-emphasis desirable for longitudinal magnetic recording.

Erasure of magnetic recording directly on the unit is not contemplated, inasmuch as editing will in general be carried out by recording on other stock and splicing a section of tape to substitute for an expunged recording. Bulk erasure of the reel will be understood to effect the most satisfactory removal of previously recorded matter, as by subjecting the entire reel to an alternating magnetic field for a suitable length of time. Such techniques are believed to be well known in the art and need not be elaborated here.

In the description so far it has been the assumption that the direction of motion of the tape engaging a transducer is at right angles to the direction of the gap, and that the engagement is substantially uniform sliding contact of the prepared side of the tape across the gap which spans the width of the track. In practice it has been found extremely difficult to establish and maintain for long periods a precise adjustment of all parameters involved in optimum orientation of the gap relative to the track along the tape. As those familiar with the art will readily understand, it has not heretofore been possible with the devices of the prior art to attain these joint objectives. Applicant has determined by extensive trial and experimentation that for complete adjustment of all parameters (azimuth, twist, tangency), a transducer-mounting device requires to be adjustable separately for rotation of the gap about each of three axes at right angles to each other. Applicant has further established that a narrow limp tape of the character described should engage a gap with constant tension and should wipe the gap with a deflection of the lay of about 6° of angle relative to the tangent line across the gap. It is to be understood that reference throughout the present discussion and in this specification is made to longitudinal magnetic recording, as by means of a slotted magnetically permeable body wherein a magnetic field is set up corresponding in some manner to a signal which is impressed or is to be impressed on the record medium, the direction of flux lines bridging the slot or gap being in the direction of motion or advance of the record medium.

Figure 13:
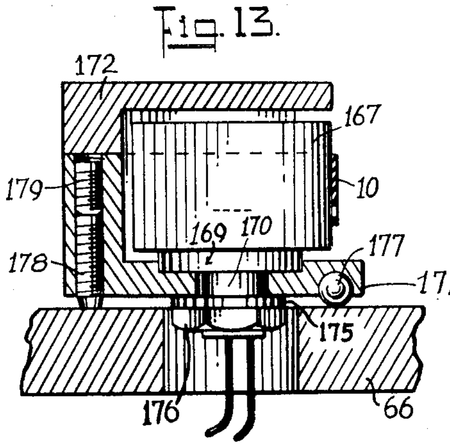
FIGURE 13 is a sectional view through a magnetic transducer on a plane indicated by the line 3—3 in FIGURE 2.
Figure 14:
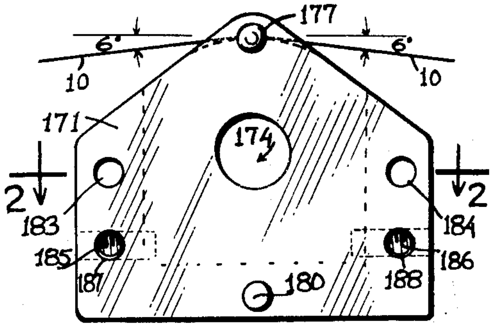
FIGURE 14 is a view of the transducer of FIGURE 2 looking outwardly of the mounting plate from below.

In a practical example of a completely orientable mounting for a magnetic transducer, it is contemplated to use a head such as one of those commercially manufactured by the Brush Development Company under the designations BK1090 to BK1091 inclusive, or BK1200 to BK1202 inclusive, such a unit comprising an assembly with a mounting bolt extending in a direction parallel to the length of the gap. As will appear from a study of FIGURES 13, 14 and 15, a head assembly 167 having affixed thereto a short cylindrical boss 169 and a bolt 170′ coaxial therewith and extending beyond the boss, is seated in a two part shell or enclosure comprising a base 171 and a cap 172. A short cylindric bore 173 in the base together with a coaxial aperture 174 of reduced diameter respectively receive the head assembly boss as a snug fit in the bore while the bolt 170′ extends through the aperture, the nut being freely received in a hole in plate 66. Spring washer 175 and nut 176 threaded on the end of the bolt serve to retain the head assembly in the mounting.

The head assembly includes a cylindrically arcuate face wherein a gap (not shown) is seated or embedded in a body and is disposed with the length of the gap at right angles to a tangent to the curvature of the gap. The tape lies in contact with the gap, as shown in FIGURE 2 and in section in FIGURE 13. It will be observed that the line of contact between the gap and the tape, if extended, would pass through a ball 177 seated in the lower face of the base 171. The enclosure is by design of rigid and unyielding character, for example being milled from aluminum or its alloys, and grub screw 178 is locked in place 180 by a second screw 179 lying within the body 171. Consequently the position of the head may be rotated about the rest point of ball 177 as center, to orient the gap with respect to the line of contact of the tape, by varying the projecting length of screw 178. By suitable choice of dimensions and using a fine thread for the grub screw it is possible to make a highly precise permanent setting of this parameter, viz., twist.

Figure 15:
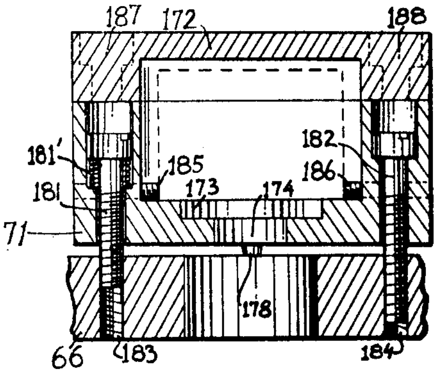
FIGURE 15 is a sectional view through the transducer of FIGURE 2 on a plane indicated by the line 2—2 in FIGURE 14.

Additional adjustment as indicated in FIGURE 15 is provided for rotation of the azimuth of the gap to control the alignment of the gap relatively to direction of advance of the tape. It is well understood that the direction of tape motion and the direction of the length of the gap should be precisely at right angles. A pair of machine screws 181, 182 having heads of somewhat larger diameter than the shanks, are respectively freely passed through bores in body 171 and are threadedly engaged in tapped holes 183, 184 in plate 66. It may be observed by referring to FIGURE 14 that a line drawn between axes of the bores in which the screws are received bisects a line normal thereto passed between ball 177 and the screw 181. It can therefore be readily shown that by suitably advancing or retracting the screw 182, the enclosure may be rocked about an axis in the surface of plate 66 including the contact areas of screw 178 and ball 177, provided that the spring 181′ which is interposed between the base of the head of screw 181 and its seat in body 171 is not fully compressed. As screw 182 is manipulated, spring 181′ exerts a biasing force tending to tension screw 181 and to press the points of screw 178 and ball 177 against the plate. By the use of this adjusting facility the gap may be aligned in azimuth positively and easily to an accuracy of a small fraction of a degree of arc.

A further control is provided as illustrated in FIGURE 15, for bodily rotating the head assembly 167 into tangency with a lay 10 and to bring the line of contact of the tape with the gap into registry with the seating area of ball 177. This is accomplished by additional grub screws 185, 186, disposed in line on opposite sides of body 171 and threadedly engaged in tapped holes, the inner ends of the screws pressing against the sides of the head assembly beyond the bolt axis, as will be understood with reference to FIGURE 15. The rotation of the assembly 167 in a clockwise direction as viewed from above is achieved by withdrawing screw 186 and turning in screw 185 until the assembly has rotated in its seat in bore 173 to the required position. Similarly, rotation in anti-clockwise direction may be effected by reversing the sense of advance of the screws. On completion of the setting both screws are left in firmly engaging contact with the side walls of the assembly to hold the setting permanently.

In carrying out an adjustment of transducers, heads 18 and 19 are introduced into their respective lower shells or bases 171 and are attached to the mounting by turning up the respective nuts 176 on spring washers 175. Each enclosure is then placed into position and the screws 181, 182 are registered with the tapped holes prepared in the plate 66. Grub screws 185 and 186 in each of the mountings are next initially adjusted to approximately center the assembly in the mounting, and the grub screw 178 is either retracted or advanced as necessary for bringing the entire length of the gap into contact with the tape surface without twisting the tape in its lay between the flanges.

It is essential to align the gap for true transverse contact across the width of the tape, and for optimum adjustment a standard or reference tape which has previously been recorded with the gap set precisely transversely to its length is preferably employed, together with test instruments whose functions will be understood by those skilled in the art. Briefly the test procedure involves reading the recorded standard or reference record with the head under test, and monitoring the output signal for peak output of a high frequency such as 8 kc. per second in the case of tape used with 16 mm. film strip. During the reading the head is rotated or rocked in small angular increments by screw 182 about an axis normal to the face of the tape. Accordingly, such procedure is next indicated in carrying out the azimuth setting of each gap, and an optimum setting determined. The screw 181 is then turned down firmly against spring 181′ to lock the setting permanently.

The correct position of the transducer is achieved when a recorded high frequency will replay in either direction of movement of the tape relatively to a reading head, with substantially the same peak output level. This is a critical test which determines whether the three axes of adjustment of the head are correctly aligned, and in addition is a test of the correct positions of the entire transport system including the idlers. The provision for reverse drive of the tape has been found to gain the important advantage of testing the calibration of each instrument.

When the settings are made, the cover shell 172 is placed in registry with the lower shell 171, and is secured thereto by means of cheese-headed screws received in countersunk holes 187, 188, the holes extending through both shells. The length of these screws is chosen so as not to extend to screws 185, 186.

It will be evident from the foregoing description that the precise and permanent adjustment of a transducer in relation to a lay of tape guided by flanged discs may be carried out by the means described, where the transport system including the discs is in pre-determined relation with a mounting plate. It has been established as a fact that once the settings have been made, no further adjustment is required even after long intervals, as borne out by extensive use of actual embodiments, which use has extended upwards of one thousand hours per unit under widely varying environments, with no observable alteration in the settings. The miportance of this feature of the system may be the better appreciated when it is considered that the audio signal involved was highest quality motion picture studio sound.

By virtue of the use of a primary standard of the best obtainable precision of azimuth setting when initially setting the heads of all sound units, it is assured that a tape record made on any one may be played back on any other unit without risk of deterioration of signal quality as would arise where gap settings have not been referred to a common standard.

In use of a sound recording and reproducing unit as herein set forth the tape may be threaded into or removed from the loop in a short time, the open arrangement of the elements on the face of plate 66 together with the use of toggling idlers such as 13 and 23 facilitating the operation to a marked degree as compared with prior art tight loop tape sound systems. It has been found however that the use of conventional prior art reels and latches has impeded the mounting and removal of reels and not permitted the quick and simple handling which is especially desirable in using a double system. Applicant has therefore provided novel and improved reel latches integral with the axles of a reel magazine whereby it suffices merely to press the reel axially of the axle to have it drivably engaged thereby and retained thereon, and by means of which a mounted reel may be released and removed with one hand.

Figure 21:
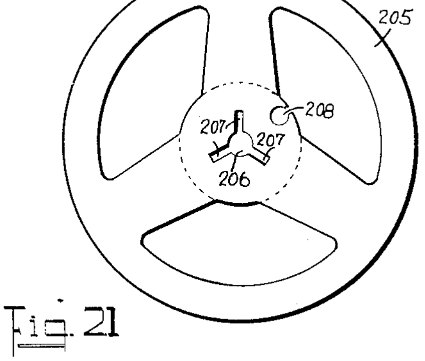
FIGURE 21 is an elevation of a reel of known type for storing tape and representative of a body to be supported by the axle insert of FIGURE 17; and, FIGURE 22 is a schematic diagram for analyzing current distributions from bias and audio frequency generators.

The foregoing ends are accomplished by the reel latching axle device set forth in FIGURES 16 to 20 inclusive in conjunction with a known type of reel illustrated in FIGURE 21 and generally designated 205. It will be seen that the reel includes conventional opposed peripheral annular discs each joined by three arms to a core through which an axial opening 206 extends, having three connecting radially equi-angularly spaced narrow slots 207. A tape end receiving recess 208 is formed within the core. The reel as shown forms no part per se of the present invention and is described to facilitate understanding of the construction and purposes of the reel latching axle 189, shown in FIGURES 16 to 20.

Figure 16:
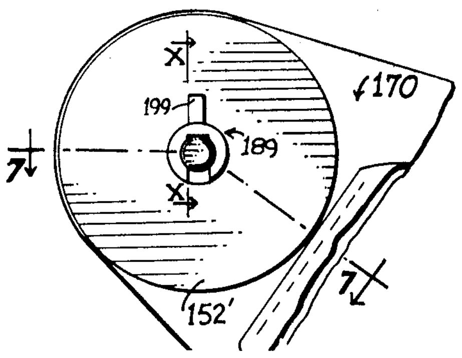
FIGURE 16 is an elevation of an alternative reel mounting axle for the reel magazine, being an axle insert and collar.

The axle 189 is substitutable for or preferably insertable into either of the axles 43 and 47 of FIGURE 10, and is indicated in FIGURE 16 as being inserted into and extending from the left axle, with retaining collar 152' secured upon it.

Figure 17:
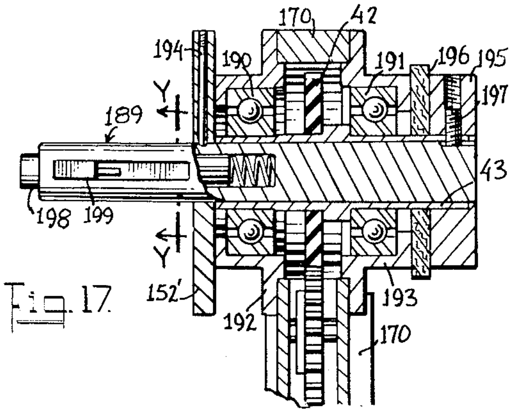
FIGURE 17 is a view partly in section including the axle and insert, taken on a folded plane indicated by line 7—7 in FIGURE 16.

Turning to FIGURES 10 and 17, a reel supporting axle includes forwardly and rearwardly located ball bearings 190, 191 whose inner races are received on hollow axle 43 and retained by flanges, and whose outer races are retained in cups 192, 193 attached to frame 170. Final drive gear 42 is secured to the hollow axle in driving relation therewith. Collar 152' which is pinned as by a rivet 194 to shaft 189 is set against the end of axle 43. A drag clutch comprising disc 195 and felt washer 196 is attached to the end of axle 43 and secured by grub screw 197 at an adjusted compression of the washer, which is squeezed between the disc and the frame. The amount of frictional loading so developed is adjusted to prevent a large loaded reel from running freely when in take-off relation and the drive to the loop is stopped. The grub screw engages a flattened end of shaft 189 to couple it to axle 43.

A reel such as that in FIGURE 21 is intended to be mounted on the shaft 189 and to lie between a projection 199 and the collar 152'. As will be seen in views of FIGURES 18, 19, and 20, the projection 199 comprises a shoulder formed in a latch part 200 whose thickness is greater than the width of slot 207 in the core of reel 205. A further projection 201 extending from the latch 200 is of lesser height and thickness than is the projection 199 and is adapted to be received freely within a slot 207 when the reel is in position.

Figures 18, 19, 20:
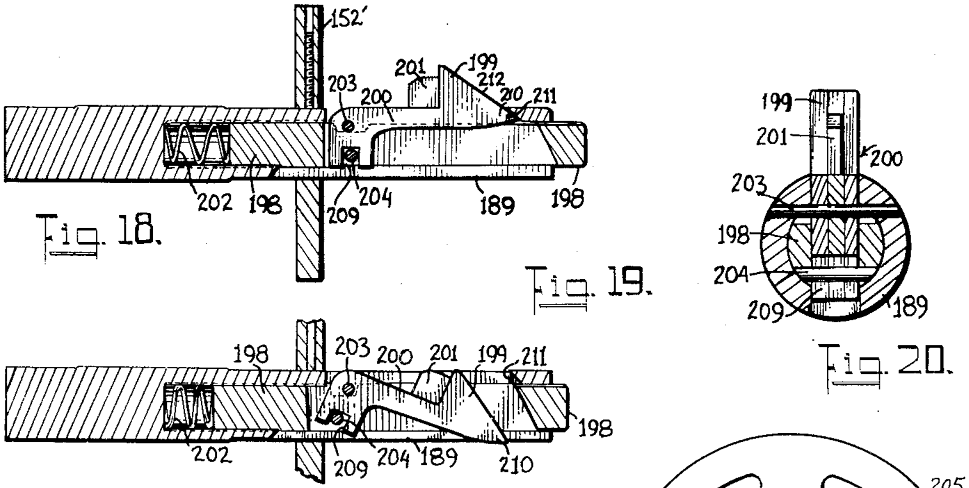
FIGURE 18 is a view through the axle insert of FIGURE 16 on a chordal plane as indicated by the line X—X and showing structure of a reel retaining latch and key.
FIGURE 19 is a view similar to that of FIGURE 18 showing the reel retaining latch retracted within the axle.
FIGURE 20 is a section on a plane transverse to the axle insert of FIGURE 17, indicated by line Y—Y.

Latch 200 is retractable entirely within the cross-sectional outline of shaft 189 and may freely enter a longitudinal slot formed in the shaft and a corresponding slot formed in the actuator body 198. As indicated in FIGURE 20, the slots are in registering relation and are centered on a diametrical longitudinal plane. In FIGURE 19, body 198 which is coaxial with the shaft has been pressed inwardly to the left to compress a captive spring 202 seated in a bore wherein body 198 is received. Latch 200 pivots about a pin 203 set transversely of the shaft 189, the ends of the pin being secured in the opposed walls of the latter. A notch 209 formed in the latch part 200 engages a pin 204 secured between the walls of body 198.

It will be seen that in the rest position of body 198 as shown in FIGS. 16, 18 and 20, the spring 202 bears against the end of the body and imparts a force by pin 204 directed longitudinally against a wall of notch 209. This force tends to urge the latch 200 to swing about a pivot axis in 203 in anticlockwise direction. The limit position is reached when the top 210 of the latch bears against the sloping face 211 formed within the end of shaft 189. If now the body 198 is pressed inwardly by exerting axial pressure on the outer end, the pin 204 is moved to the other side of notch 209, bringing about anticlockwise rotation of the latch and restracting it within the shaft. In such position the reel may be slid off.

To mount a reel it is only necessary to fit hole 206 of a reel over the end of shaft 189 and to then axially slide it inwards, whereupon the inclined rear face 212 of the latch causes the latter to be swung down, and when the reel has passed the highest part of the projection 199, the latch snaps up into rest position. The rotation of the reel relatively to the shaft brings the projection 201 into registry with a slot 207 to positively engage the reel with shaft 189. In most instances it will be a simple matter to first orient the reel angularly to effect such registry directly the reel has been pushed against collar 152'.

Release of the latch may be simply accomplished when it is desired to remove a reel, by placing the fingers behind the reel and pressing with the thumb against the button end of the body 198. As the latch is retracted, the reel is urged outwardly along the shaft and removed. Consequently both reels may be simultaneously removed, one by each hand, and in a minimum of elapsed time.

I claim:

1. In combination with an image system of the type wherein a sprocketed film strip is advanced by a film loop drive mechanism at constant average velocity, a separate sound recording and reproducing apparatus comprising a thin flexible tape record medium having sprocket-engageable perforations therealong, sound transducer head means disposed in transducing relation with the tape, tape transport means including a toothed sprocket wheel for moving said tape as a fixed length tensioned loop at substantially constant speed relatively to said transducer means, constant speed powered driving means, transmission means powered by said driving means connected with said transport means and disconnectably connectable with said film loop drive mechanism for moving said film strip and said tape at proportional velocities when said driving means are connected with said mechanism, said transport means comprising a pair of freely rotatable flywheels supported on respective shafts spaced in line with said transducer means and journalled in a frame, each flywheel being driven by friction of a lay passing in contact over a respective pulley fixed to each shaft, a pair of spring pressed idling rollers engaging tape lay portions approaching and leaving said pulleys on a side thereof remote from said transducer, said sprocket wheel engaging a pair of lays entering and leaving said idling rollers on a side remote from said pulleys, said idling rollers being mounted on pivoting supports for arcuate movements toward and away from said shafts whereby to maintain constant the length of lay in frictional contact with each of said pulleys, resilient means coupling said supports with said frame for stabilizing the tension of said tape loop, and viscously deformable solid damping means fixed in the frame and coupled with said supports for opposing said arcuate movements.

2. The combination of claim 1 wherein said resilient means comprise a first spring having its ends connected with each support intermediate an idling roller and the support pivot, and a second and a third spring connected in tension between said frame and a support on opposite sides of said first spring whereby to tension said first spring to provide a first equilibrium position for said idling rollers in the absence of a tape loop, and to provide an operating equilibrium position when said rollers engage said loop to tension said tape.

3. In double system motion picture image and sound equipment including picture film strip drive apparatus wherein a film loop is positively driven and a shaft forming part of said drive has a speed of rotation proportional to average film velocity, sound recording and reproducing apparatus including a limp tape record medium having perforations regularly spaced along the length thereof for engagement by a toothed drive sprocket, tape transport means including said sprocket for moving said tape as a fixed length loop under tension, sound transducing means contacting a lay of said tape in transducing relation, tape speed stabilizing means including two rotatable flywheel masses spaced on opposite sides of said transducing means and having pulley means fixed thereto for fractional drive by a pair of aligned lay portions of said tape and including two spring pressed idler roller lay tensioning elements movable in arcs to which said aligned lays are commonly tangent, viscously deformable solid damping members coupling said idler elements for resisting arcuate movement thereof, a constant speed drive motor, a transmission, means coupling said motor, said transmission and said drive sprocket to effect drive of said tape at a predetermined speed, and separable coupling means for mechanically coupling said transmission and said shaft whereby to correlate said average film strip velocity and said tape speed when said shaft and said transmission are coupled.

4. Sound recording and reproducing apparatus for use with cinematic recording and reproducing equipment of the type wherein a loop of film strip picture record medium is driven at an average velocity proportional to the speed of a drive shaft, comprising a magnetizable limp tape sound record medium having longitudinally spaced perforations adapted to engage sprocket teeth, a tape transport mechanism including a toothed drive sprocket engaging lays of tape advancing into and moving out of a fixed tensioned loop of said tape medium and a pair of flywheel masses having respective axes spaced apart and disposed parallel with each other and having integral pulleys each driven by a lay of tape passing therebetween, and including a pair of spaced apart speed stabilizing idler rollers supported on pivoting links disposed parallel with each other and having their pivot axes spaced a lesser distance than the interaxial spacing of said flywheel axes and along a line parallel with said spacing for maintaining in alignment a pair of lays each engaging a respective flywheel pulley and an adjacent stabilizing idler, a pair of fixed idlers disposed between the drive sprocket and the stabilizing idlers in line with said links to align the lays extending between a fixed and a stabilizing idler in parallel and at right angles to the said pair of lays, spring means biassing said stabilizing idlers toward each other in a direction parallel with said aligned pair of lays, a viscously deformable body in solid state coupled to at least one of said links for damping link movement, transducer means disposed in transducing relation with a lay extending between said flywheels, a transmission, a constant speed drive motor coupled with said transmission for driving said transport mechanism, and means separably coupling said transmission with said drive shaft for correlating the drive for said film strip with the drive for said tape.

5. Apparatus as in claim 4 wherein said tape transport is reversible and wherein said spring bias means comprise a system of parallel tensioned springs arranged to that a floating spring having its ends joined with each link tends to draw said idlers together and further springs each having one end immovable and the other end fixed to a link tend to draw said idlers apart.

6. Apparatus as in claim 4 wherein each link is coupled with said viscously deformable solid body and said body comprises polyvinyl butyral.

References Cited in the file of this patent

UNITED STATES PATENTS

| | | |
|---|---|---|
| 1,873,342 | Serrurier | Aug. 23, 1932 |
| 1,891,738 | Thomas | Dec. 20, 1932 |
| 1,974,709 | Freund | Sept. 25, 1934 |
| 2,002,111 | Hensen | May 21, 1935 |
| 2,051,789 | Foster | Aug. 18, 1936 |
| 2,343,850 | Fairbanks | Mar. 7, 1944 |
| 2,378,611 | Westerkamp | June 19, 1945 |
| 2,634,335 | Stolaroff | Apr. 7, 1953 |
| 2,641,655 | Bobb | June 9, 1953 |
| 2,646,989 | Davis | July 28, 1953 |
| 2,647,702 | Wright | Aug. 4, 1953 |
| 2,652,989 | Ripley | Sept. 22, 1953 |
| 2,680,785 | Franklin | June 8, 1954 |
| 2,702,834 | Colle et al. | Feb. 22, 1955 |
| 2,757,242 | Ranger | July 31, 1956 |
| 2,769,037 | Dank et al. | Oct. 30, 1956 |

FOREIGN PATENTS

| | | |
|---|---|---|
| 382,860 | Great Britain | Nov. 3, 1932 |